(12) United States Patent
Wetsch

(10) Patent No.: US 7,165,671 B2
(45) Date of Patent: Jan. 23, 2007

(54) HUB FOR STORAGE PACKAGE

(75) Inventor: Thomas D. Wetsch, St. Charles, IL (US)

(73) Assignee: Pinnacle Design Technology, St. Charles, IL (US)

( * ) Notice: Subject to any disclaimer, the term of this patent is extended or adjusted under 35 U.S.C. 154(b) by 0 days.

(21) Appl. No.: 10/639,851

(22) Filed: Aug. 13, 2003

(65) Prior Publication Data

US 2004/0045846 A1 Mar. 11, 2004

Related U.S. Application Data

(62) Division of application No. 09/885,770, filed on Jun. 20, 2001, now Pat. No. 6,715,607.

(51) Int. Cl.
*B65D 85/57* (2006.01)
(52) U.S. Cl. .................. 206/310; 206/308.1; 206/493; 211/41.12
(58) Field of Classification Search ................ 206/232, 206/307, 308.1, 309, 310, 312, 193, 493; 211/40, 41.12; B65D 85/57
See application file for complete search history.

(56) References Cited

U.S. PATENT DOCUMENTS

| | | | |
|---|---|---|---|
| 2,398,573 A | 4/1946 | Becker | |
| 2,568,365 A | 9/1951 | Root | |
| 4,327,831 A | 5/1982 | Inaba et al. | |
| 4,634,004 A | 1/1987 | Mortensen | |
| 4,640,413 A | 2/1987 | Kaplan et al. | |
| 4,643,301 A | 2/1987 | Hehn et al. | |
| 4,709,812 A | 12/1987 | Kosterka | |
| 4,765,462 A | 8/1988 | Rose, Jr. | |
| 4,765,466 A | 8/1988 | Ivey | |
| 4,802,601 A | 2/1989 | Pijanowski et al. | |
| D332,048 S | 12/1992 | Pennell | |
| 5,193,681 A | 3/1993 | Lievsay | |
| 5,284,242 A | 2/1994 | Roth et al. | |
| 5,284,243 A * | 2/1994 | Gelardi et al. | 206/308.1 |
| 5,332,089 A | 7/1994 | Tillett | |
| 5,366,074 A | 11/1994 | O'Brien et al. | |
| 5,402,882 A | 4/1995 | Bandy et al. | |
| 5,417,324 A * | 5/1995 | Joyce et al. | 206/310 |
| 5,462,159 A | 10/1995 | Roth et al. | |

(Continued)

FOREIGN PATENT DOCUMENTS

GB 2 273 286 A 6/1994

(Continued)

*Primary Examiner*—David T. Fidei
(74) *Attorney, Agent, or Firm*—Greer, Burns & Crain, Ltd.

(57) ABSTRACT

A hub for a storage package for storing a recording medium includes a base member, an uninterrupted deformable, generally domed portion, and at least one gripping formation extending from the generally domed portion. The gripping formation is positioned to extend through a hole in the recording medium and engage the inner edge of the recording medium as the medium is placed onto the hub. The generally domed portion and the gripping formation are directly joined at a location disposed above the recording medium when the recording medium is placed onto the hub. Deformation of the generally domed portion in a direction transverse to the base member directly causes the gripping formation to retract radially inward to allow removal of the recording medium.

17 Claims, 3 Drawing Sheets

U.S. PATENT DOCUMENTS

| | | | |
|---|---|---|---|
| 5,529,182 A * | 6/1996 | Anderson et al. | 206/308.1 |
| 5,533,614 A | 7/1996 | Walker | |
| 5,593,030 A * | 1/1997 | Tell | 206/308.1 |
| 5,651,458 A | 7/1997 | Brosmith et al. | |
| 5,685,427 A | 11/1997 | Kuitems et al. | |
| 5,727,680 A | 3/1998 | Liu | |
| 5,788,068 A | 8/1998 | Fraser et al. | |
| 5,829,582 A | 11/1998 | Ippolito et al. | |
| 5,848,689 A | 12/1998 | Mueller | |
| 5,865,307 A | 2/1999 | Friedman | |
| 5,881,872 A * | 3/1999 | Frick | 206/308.1 |
| 5,884,761 A | 3/1999 | Gelardi et al. | |
| 5,887,713 A | 3/1999 | Smith et al. | |
| 5,887,714 A | 3/1999 | Yeo | |
| 5,944,181 A | 8/1999 | Lau | |
| 6,170,656 B1 * | 1/2001 | Cerda-Vilaplana et al. | 206/308.1 |
| 6,237,763 B1 * | 5/2001 | Lau | 206/308.1 |
| 6,412,631 B1 * | 7/2002 | Belden, Jr. | 206/308.1 |
| 6,502,694 B1 | 1/2003 | Pijanowski et al. | |
| 6,516,945 B1 | 2/2003 | Myszka et al. | |
| 2001/0037953 A1 * | 11/2001 | Gelardi | 206/310 |
| 2001/0047947 A1 | 12/2001 | Lau | |
| 2002/0112976 A1 * | 8/2002 | Huber | 206/310 |

FOREIGN PATENT DOCUMENTS

| | | | |
|---|---|---|---|
| JP | 02-205589 | | 8/1990 |
| JP | 2-205589 | * | 8/1990 |

* cited by examiner

HUB FOR STORAGE PACKAGE

This application is a divisional of application Ser. No. 09/885,770, filed on Jun. 20, 2001, now U.S. Pat. No. 6,715,607, issued Apr. 6, 2004.

BACKGROUND OF THE INVENTION

The present invention relates to an environmentally acceptable storage package for a recording medium, such as a digital versatile disc (DVD), compact disc (CD), or the like, which is designed to discourage shoplifting, and to a method of assembling such apparatus. More particularly, the present invention relates to such a storage package that is formed from a plastic frame and non-plastic panels.

The term "recording medium" as used in the context of this specification broadly encompasses any medium on which information may be digitally recorded. This includes the standard 120 mm diameter disc used to carry, for example, recorded text, image, audio, video, and binary data, as well as similar discs of various sizes for other information and data. Typically, such recording mediums are stored in packaging prior to purchase and/or when not in use. Such packaging commonly takes the form of a multi-piece injection molded package that requires assembly. A hinged lid, a base and a separate liner are usually included. Aside from the cost of production and assembly, such recording medium packages are difficult to open by the consumer. It is not uncommon for the consumer to exert an amount of force in opening the package that results in the recording medium coming loose from the packaging, or becoming scratched.

The recording medium has generally been packaged in the well-known "jewel case" which is popular with CD's and formed almost entirely of rigid plastic elements hingedly connected along one side of the frame. The jewel case has become standard in the industry due to its durability and the high level of protection it gives the recording medium. However, the jewel case has proven to be a relatively expensive and environmentally unacceptable package because of its use of non-biodegradable plastic in large quantities.

Currently, there are two designs that are primarily used for packaging recording mediums, particularly DVD's. U.S. Pat. Nos. 5,788,068 and 5,366,074 disclose the two most common storage packages for this type of recording medium.

The '068 patent discloses a package similar to the jewel case but incorporating different features such as the hinge and the latching mechanism, as well as incorporating additional features such as clips for graphics inserts. However, in addition to sharing the jewel case's disadvantages, the '068 patent's frame is opaque, rendering less surface area for graphics and it is laborious to assemble.

The package disclosed in the '074 patent is formed of a plastic recording medium holder and a plurality of interconnected paperboard panels that pivot about a spine between an open and a closed orientation. This latter package is more versatile in presenting a multitude of visually appealing graphic panels and, with exception to the recording medium holder, is made exclusively of biodegradable paperboard. However, the paperboard package has not proven completely satisfactory in use because it does not provide the stability or the durability of the jewel case. Additionally, the paperboard package is susceptible to fraying and destruction from common use that could result in deterioration of the identifying information on the package.

A further problem with the paperboard package and also to some extent, the '068 package, is the relative ease with which a shoplifter can access the recording medium by slitting the protective shrink wrap and removing the recording medium from the packaging while leaving the package intact. Additionally, a further problem associated with recording medium packaging is the need to apply an additional sticker with imprinted identifying indicia on the lateral spine of the package such that the recording medium is easily identified when displayed in stacks at the point of sale. The prior art packages lack the versatility and the ability to display additional promotional products or images on the exterior package.

Thus, there is a need for an inexpensive recording medium package of sufficient rigidity made of a paperboard blank and a frame that is easily assembled, incorporates a feature that deters shoplifting, and minimizes the amount of waste that must be disposed after purchase. Also, there is a need for a package which is capable of accommodating promotional graphics, coupons, or discs.

Accordingly, a first object of the present invention is to provide an improved recording medium package which is relatively economical to manufacture and assemble.

Another object of the present invention is to provide an improved recording medium package which is ecologically sound, being composed substantially of recycled or recyclable paperboard.

A further object of the present invention is to provide an improved recording medium package which provides protection to paperboard graphics laden panels and prevents fraying and destruction of the paperboard.

Yet another object of the present invention is to provide an improved package which includes structure configured for deterring shoplifting.

SUMMARY OF THE INVENTION

The above-identified objects are met or exceeded by the present recording medium package having a blank that cooperates with a first and a second frame component to form an enclosable space for a recording medium, and a hub structure for releasably receiving a recording medium. A central spine panel hingedly joins the first and the second frame components and allows pivoting of the frame components about a folding axis. The first and the second frame components each include at least one raceway that slidably receives a blank having a plurality of panels defined by scores. Scoring on the blank allows it to be folded into separate panels, each of which are guided and supported by the frame component raceways to enclose the recording medium. Each of the raceways is preferably dimensioned to receive multiple blanks or other generally planar materials such as promotional items, and at least one raceway is configured to receive the blank in a direction either normal to or parallel to the folding axis.

Another feature of the present recording medium packaging is a resilient, disc-engaging hub having a generally domed or conical shape that releasably secures the recording medium. When secured on the hub, the recording medium may rest on or between a gripping formation such as, for example, a series of protrusions or a shelf-like shoulder around the periphery. The hub is integrally formed on a base member which is used to secure the hub to the frame hub-holder.

The present recording medium packaging is also provided with a point-of-sale locking device constructed and arranged to secure the frame components in a closed orientation by mating a pin and aperture structure. Upon purchase, either at the point of sale or at the consumer's home, the mating pin is cut with a knife or a scissors thereby allowing access to the recording medium.

An additional advantage of the present recording medium packaging is a foldable upper panel on the blank for the lateral spine. The upper panel is aligned with a bezel in the frame component that forms the lateral spine, eliminating the need to apply an additional sticker providing identifying indicia.

More specifically, the present invention provides a storage package for a recording medium having a first frame component having at least one side and a first engagement end and a second frame component having at least one side and a second engagement end, each of the first and second frame components configured to hingedly engage each other and at least one of the first and second frame components having at least one side that receives a blank. The blank includes a plurality of generally planar panels defined by scores which can be slidably inserted into at least one of the receiving portions of the frame components. When the blank is inserted into the first and the second frame components in an engaged position, an enclosable space for placement of a recording medium is formed.

In another embodiment, a method for assembling a recording medium package is provided, including the steps of: (1) providing a first frame component and a second frame component each having an engagement end constructed to engage the other frame component in a fixed engagement, (2) providing a receiving portion which receives blanks of different thicknesses, (3) providing the blank having a plurality of generally planar panels defined by scores, and (4) engaging the blank in the frame components such that the blank and the frame components cooperate to define an enclosable space for the recording medium.

In an alternate embodiment, a method of assembling a recording medium package includes: (1) engaging the blank in the first and the second frame components, (2) slidably moving the first and second frame components into engagement, and (3) fastening the first and second frame components to each other. Insertion of the blank into the first and the second components can occur from one of a direction parallel to and normal to the foldable axis.

BRIEF DESCRIPTION OF THE DRAWINGS

FIG. 6 is an exploded perspective of an alternate embodiment with two separate frames, one frame having the hinge and an X-type hub holder, and the blank located in between.

DETAILED DESCRIPTION OF THE PREFERRED EMBODIMENT

Figure 1:
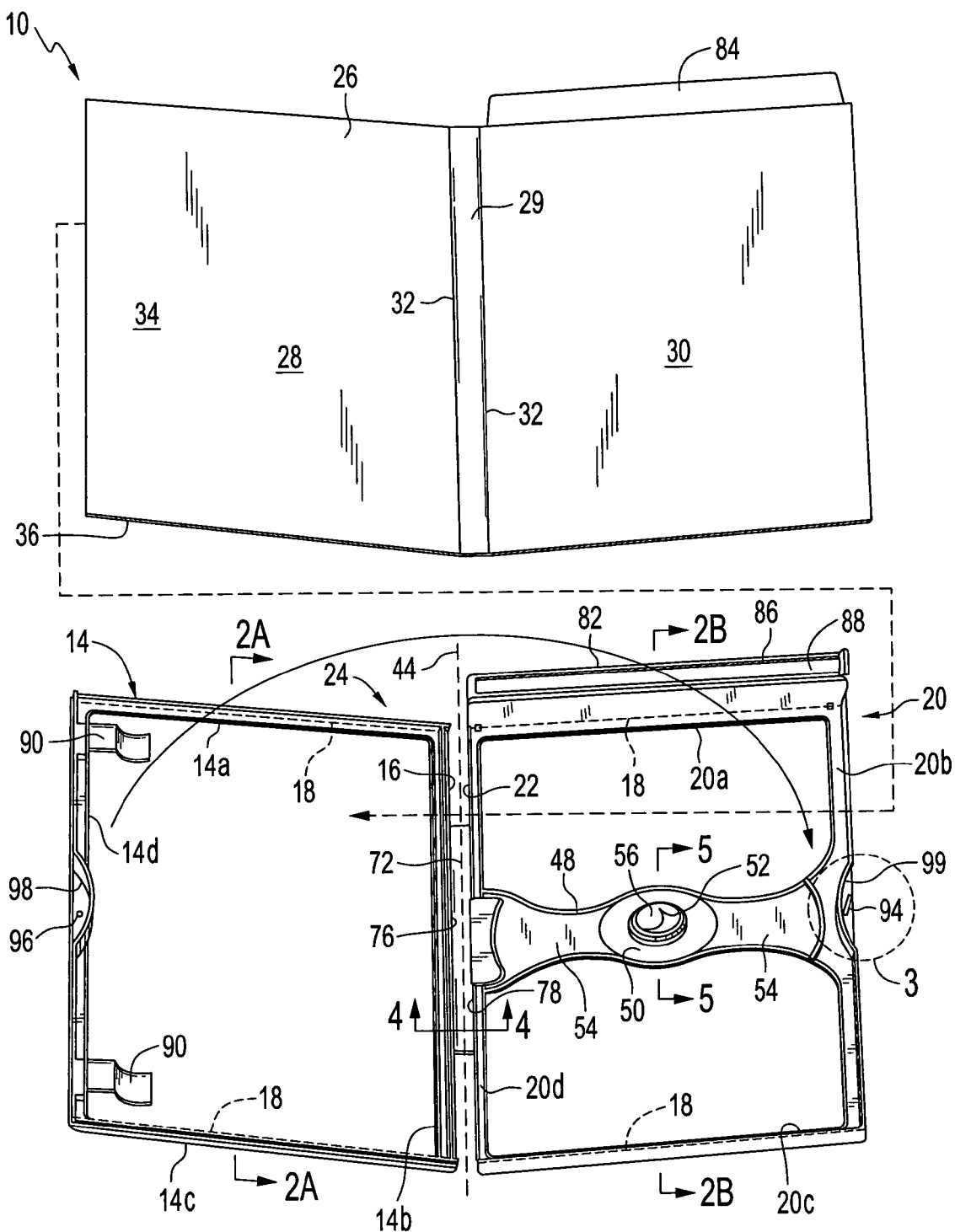
FIG. 1 is an exploded perspective view of the present package.
Figure 2A:
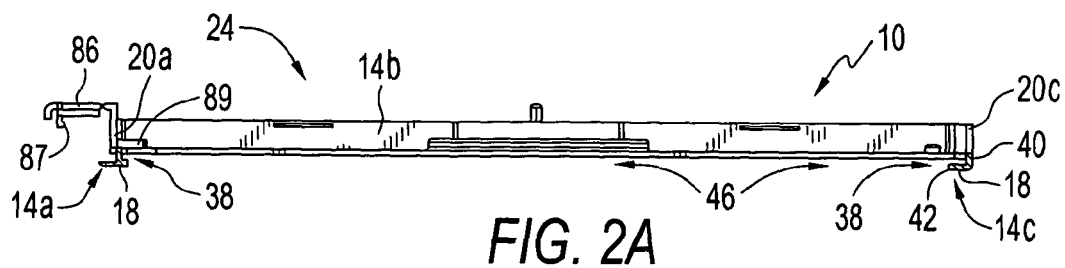
FIG. 2A is a sectional view taken along the line 2A—2A of FIG. 1 and in the direction indicated generally, the hub being removed for purposes of clarity.
Figure 2B:
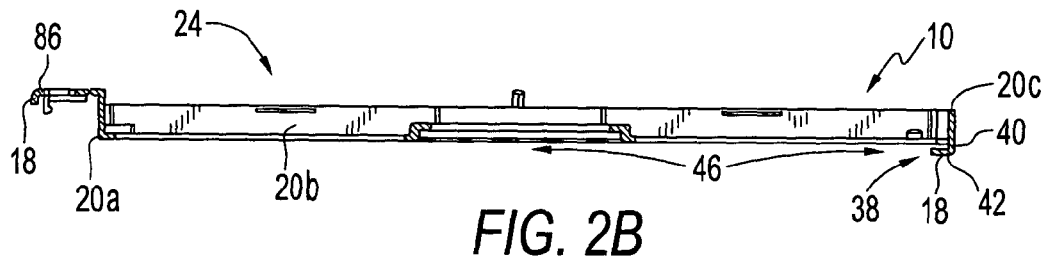
FIG. 2B is sectional view taken along the line 2B—2B of FIG. 1 and in the direction indicated generally, the hub being removed for purposes of clarity.

Referring now to FIGS. 1, 2A and 2B a package which embodies features of the present invention is generally designated 10. The package 10 is intended for use in protecting a recording medium 12 such as a CD, a DVD or other type of disk-like recording medium (best seen in FIG. 5). In the preferred embodiment, the package 10 includes a first frame component 14 having a first engagement end 16, at least one side or side member and a blank receiving portion 18 along at least one of the sides. A second frame component 20 having a second engagement end 22 is constructed for engagement with said first engagement end 16 and has at least one side having a blank receiving portion 18. The first frame component 14 and the second frame component 20 include side members labeled 14a–d and 20a–d respectively. As viewed in FIG. 1 and applicable to both the first frame member 14 and the second frame member 20, "a" corresponds to the upper member, "b" corresponds to the right member, "c" corresponds to the lower member, and "d" corresponds to the left member. Collectively, the first frame component 14 and the second frame component 20 are referred to as a frame 24. In the preferred embodiment, the frame 24 is made of an injection moldable plastic material. Preferred materials include polystyrene, polypropylene or like materials well known to skilled practitioners. However, thermoformable plastics are also contemplated, as are other inexpensive, self-supporting materials.

A blank 26 is illustrated in FIG. 1 and is preferably formed from a non-plastic material such as virgin or recyclable paperboard, often coated with a plastic material, but may consist of any suitable material which may receive printed graphics and provide structural integrity to the package. Acceptable panel materials include various types of rigid paperboard, including corrugated and end flute board, as well as planar paperboard. The blank 26 may also include, for example, an insert or promotional item such as a memory disc. The blank 26 is configured for insertion into at least one of the receiving portions 18 of the first frame component 14 and the second frame component 20, also corresponding to elongate frame member 20b, and has a plurality of generally planar panels 28, 29 and 30 defined by scores 32.

While a two major-paneled embodiment according to the present invention is illustrated, similar blanks utilizing a greater or lesser number of panels are contemplated. The plurality of panels 28, 29 and 30 may be formed from a prescored unitary blank 26 that may be preprinted on both major upper and lower surfaces 34, 36 respectively. Because both major surfaces 34, 36 of the blank 26 are nearly unobstructed when placed in the frame 24 and printing is possible on both major surfaces, a relatively large surface area is available for providing printed information.

The blank 26 cooperates with the first and second frame components 14, 20 by slidably engaging the blank receiving portion 18 of the frame 24 along a raceway 38 to define an enclosable space for the recording medium 12. At least one elongate member 14a–d, 20a–d of the frame 24 defines the open raceway 38. The raceway 38 preferably includes a leg portion 40 and a normally projecting lip portion 42 forming an "L"-shape. The length of the leg portion 40 is sufficient to accommodate a plurality of blank thicknesses. While an "L"-shaped embodiment of a package according to the present embodiment is shown, similar packages utilizing a "C"-shaped raceway or any other shaped raceway suitable for receiving the blank 26 are contemplated.

In the preferred embodiment, the raceway 38 is configured for reception of the blank 26 in one of a direction parallel to and normal to a folding axis 44 (best seen in FIG. 1). It is also preferred that the frame 24 has two opposing raceways 38 that form a channel 46 for slidingly accommodating the panels 28, 30. The raceway 38 is dimensioned to accommodate a plurality of blank thicknesses 26 or other promotional items such as graphics, coupons, or discs. When the blank 26 is positioned in the raceway 38, it is adhered to the frame component 14, 20 by chemical adhesive, heat-staking, sonic welding, or by any other method known in the art. Also, ends of the raceway 38 are closed by application of heat, which closes off or crimps the end of the raceway to prevent the blank 26 from slipping out. It is also contemplated to secure the blank 26 in the raceway 38 by mechanical fastening technology, such as a tight friction fit, projections in the raceway, and other known fastening devices. In addition, chemical adhesives and the application of heat along the length of frame members 14a–d, 20a–d may be used to fasten the blank to the frame.

Figure 5:
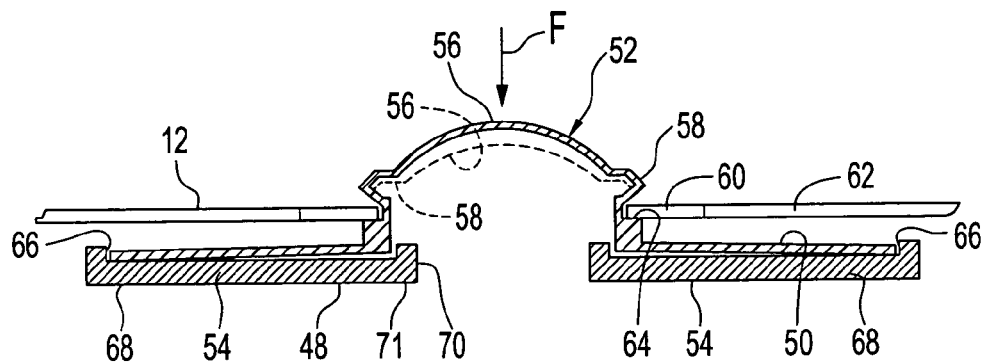
FIG. 5 is a vertical sectional view of the hub with a recording medium placed thereon, the hub base placed on the frame hub holder.

Referring now to FIGS. 1 and 5, in the preferred embodiment, the second frame component 20 has a hub holder 48 that connects a generally annular, flange-like base member 50 of a hub 52 to at least one of the frame elongate members 20a–d. In the preferred embodiment, the hub holder 48 has a pair of diametrically opposed arms 54 which are secured to corresponding elongate frame members 20a–d. While it is contemplated that the arms 54 will be integrally formed with the frame member 20, it is also within the scope of this invention to secure the arms to the frame member by chemical adhesive, sonic welding, or other known plastic attachment technologies. It is also contemplated that the number and the relative position of the arms 54 may vary to suit the application.

As shown in HG. 5, the resilient, disc-engaging hub 52 is connected at the hub base member 50 to at least one of the frame components 14, 20 for releasably securing the recording medium 12. An advantage of the present package 10 is that hub 52 is made of a different material than the frame 24. In the preferred embodiment, the hub 52 is made of a relatively flexible, resilient material, such as a member of the olefins, including polypropylene, high-density polyethylene (HDPE), low-density polyethylene (LDPE), and resins such as SAN and silicone. The hub 52 is constructed and arranged so that it secures the medium 12 in a first position (shown in solid in FIG. 5). The medium 12 is released by the user exerting a pressing force F on a generally central portion of the hub 52, which disengages the medium 12 from the hub.

As best seen in FIG. 5, the hub 52 has a generally domed or conically shaped pressing portion 56 and a gripping formation 58 for engaging and securing the recording medium 12 at a point on the medium where no information is stored 60, and maintains the information portion 62 of the recording medium out of contact with the hub holder 48 and the frame 24. The gripping formation 58 may include a series of individual, spaced protrusions, or a continuous annular formation, or any other similar formation that urges or biases the medium 12 against a raised annular shoulder 64 of the hub 52. By applying the force F to the domed portion 56, the gripping portion 58 retracts or pivots vertically out of engagement with the medium 12 (shown in phantom). Connecting the hub 52 to the hub holder 48, is the base member 50 which is adhered, heat-staked, or secured by any other adhesive technology known in the art, to the hub holder 48.

It is contemplated that the base member 50 is securable to either an upper surface 66 of the hub holder 48 or, alternatively, to a lower or back surface 68 of the hub holder. In the event that the latter construction is used, the hub pressing portion 56, the gripping formation 58, and the annular shoulder 64 will all project through an opening 70 in a central portion 71 of the hub holder 48. It is also contemplated that the hub holder 48 is mounted on either frame component 14, 20.

Figure 4:
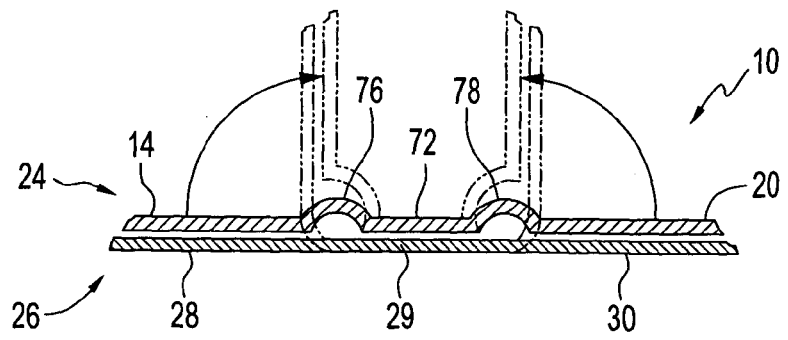
FIG. 4 is a fragmentary perspective view taken along the line 4—4 of FIG. 1 and in the direction indicated generally, the pivoting of the hinge shown in phantom.

Referring now to FIGS. 1 and 4, a hinge 72 is attached to at least one of the frame components 14, 20 and is configured to hingedly attach the first and second opposing engagement ends 16, 22 of each corresponding frame components. The first and second panels 28, 30 of the blank 26 are each hingedly joined to the central spine panel 29 and are pivotable about a folding axis 44 between an open orientation and a closed orientation. The hinge 72 is in registry with the central spine panel 29 and is configured to accommodate any shifting of the blank 26 in a direction normal to the folding axis 44 upon placing the package 10 in a closed orientation.

In the preferred embodiment, the hinge 72 is integrally formed with one or two frame components 14, 20 and the hinge action is obtained by making the hinge edges 76, 78 in a scored or otherwise thinned construction. Alternatively, and referring to FIG. 4, the hinge edges 76, 78 are provided in a generally arcuate or semi-circular shape to better accommodate the above-described normal movement (shown in phantom). It should be understood that the hinge 72 is not limited to be integrally joined to at least one of the frame components 14, 20, but includes any hinged connection known to one in the art, including but not limited to separate hinge panels 172 joined to the frame components 14, 20 after assembling of the package (best seen in FIG. 6).

Referring again to FIGS. 1, 2A and 2B, for purposes of identifying the recording medium 12 by a lateral spine 82 of the packaging, a foldable upper panel 84 integral to the blank 26 is provided. The upper panel 84 is aligned with at least one frame component 14, 20 that is configured for receiving a protective bezel 86 defining a central opening 88 through which the foldable upper panel 84 is visible. The bezel 86 is secured along one edge of the corresponding frame member 20a, allowing the foldable upper panel 84 to be visible along the lateral spine 82 thereby eliminating the need to apply an additional sticker providing identifying indicia. It is also contemplated to have a separate bezel 86 secured to the frame 24 after assembly. In the preferred embodiment, the bezel 86 forms part of the raceway 38. Also, the bezel 86 includes a snap member 87 for engaging a corresponding opening 89 in the frame 24 (best seen in FIGS. 2A and 2B).

Referring now to FIG. 1, within at least one of the frame components 14, 20, clips 90 are provided for holding a printed booklet or any other generally planar material included with the memory disc 12 in the package. The clips 90 are molded such that they do not interfere with the pivoting of the frame components 14, 20 between an open orientation and a closed orientation.

Figure 3:
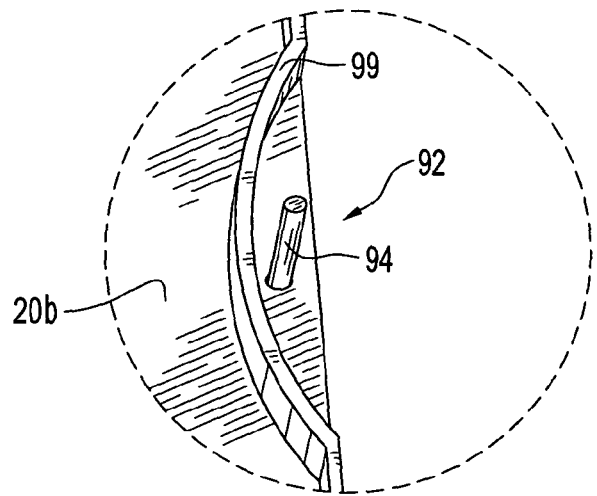
FIG. 3 is a fragmentary perspective view of the lock stud in a recess.
Figure 6:
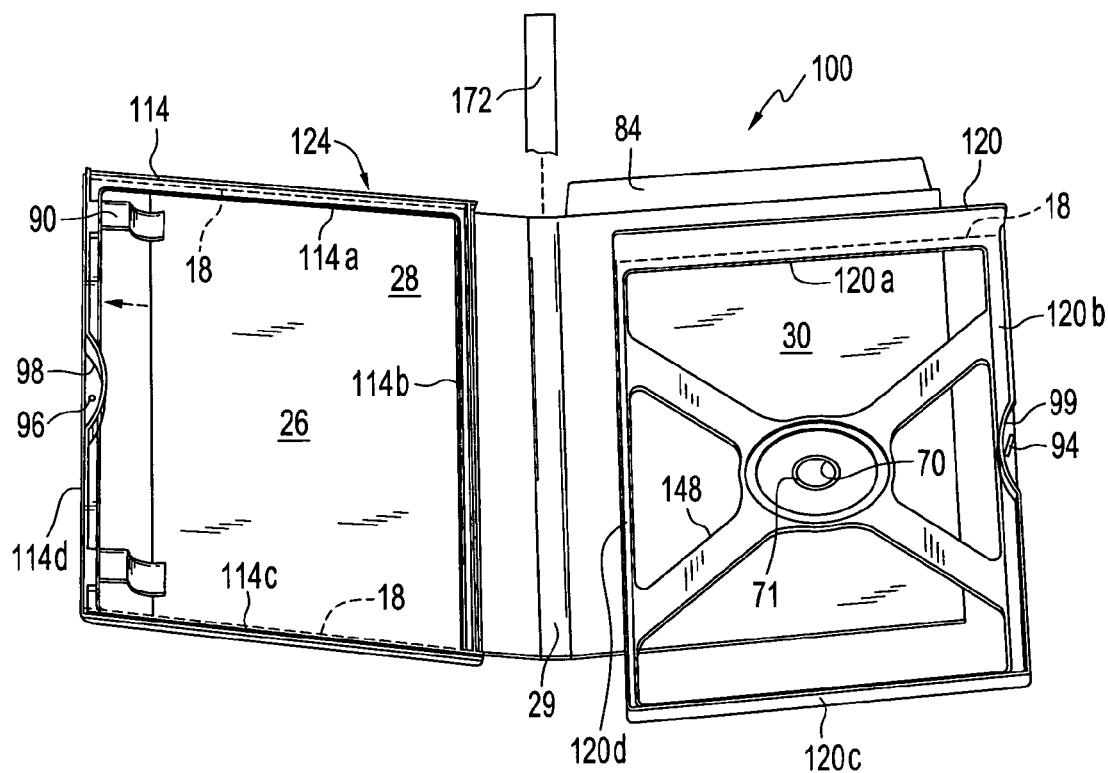

With reference to FIGS. 1 and 3, a locking device 92 is constructed and arranged for lockingly securing the first and second frame components 14, 20 in a closed orientation at the point of sale. The locking device includes a pin 94 and a mating aperture 96 on one of each of the frame components 14, 20, the pin configured to protrude through the aperture and then be sealed over the emergent side of the aperture. Sealing of the pin 94 over the aperture 96 can be accomplished, for example, by spreading or flattening the pin to form a riveted connection. A first recess 98 on the first frame component 14 and a second recess 99 on the second frame component 20 preferably house the locking device 92 allowing flush contact of the frame components 14, 20 when in the closed orientation as well as preventing pilfering of the contents. Referring now to FIG. 6, an alternate embodiment of a package that embodies features of the present invention is generally designated 100. Shared components with the package 10 are designated with identical reference numbers. The first and second frame components 114, 120 are non-integrally molded or formed, separate components hingedly joined together by a separate hinge 172 after the blank 26 is injected into the blank receiving portion 18. It is contemplated that the hinge 172 may optionally be secured to one or the other of the frame members 114, 120 prior to assembly. The hub holder 148 has an "X"-arm shape for adhesively receiving the hub base member 50. A frame 124 has a raceway configured for reception of the blank 26 in one of a direction parallel to the folding axis 44 and normal to the folding axis 44. As in the case with the package 10, in the preferred embodiment, the insertion is normal to the axis 44. When the insertion is parallel to the axis 44, the raceway is rotated 90° and is located on the members 114b, 114d and 120b, 120d rather than 114a, 114c and 120a and 120c. In this embodiment it is contemplate that the package will be assembled by: (1) engaging the blank in the first and the second frame components, and (2) slidably moving the first and second frame components into engagement, and (3) fastening the first and second frame components to each other. Insertion of the blank into the first and the second components can occur from at least one of a direction parallel to and normal to the foldable axis.

While a particular embodiment of the recording medium package of sufficient rigidity made of a paperboard blank and a frame has been shown and described, it will be appreciated by those in the art that changes and modifications may be made thereto without departing from the invention in its broader aspects and as set forth in the following claims.

What is claimed is:

1. A hub for a storage package for storing a recording medium having a circular inner edge defining a central hole, said hub comprising:

a resilient, disc-engaging hub connected to at least one frame component of the storage package for releasably securing the recording medium thereon, said resilient, disc-engaging hub having an uninterrupted deformable, generally domed portion and at least one gripping formation extending from said generally domed portion, said at least one gripping formation being positioned to extend through the hole in the recording medium and engage the inner edge of the recording medium as the medium is placed onto said hub, said domed portion and said at least one gripping formation being directly joined at a location disposed above the recording medium when the recording medium is placed onto said hub such that said at least one gripping formation is disposed above the recording medium;

a base member connecting said generally domed portion to said at least one frame component, said generally domed portion projecting from said base member;

said generally domed portion and said at least one gripping formation being disposed and arranged such that deformation of said generally domed portion in a direction transverse to said base member directly causes said at least one gripping formation to retract radially inward to allow removal of the recording medium;

wherein said gripping formation comprises a unitary, one-piece, uninterrupted annular formation extending completely around said generally domed portion without contacting said base member.

2. The hub in claim 1 wherein said at least one gripping formation in combination with said domed portion defines a radial length that is greater than a diameter of a central hole of at least one of a compact disc (CD) and a digital versatile disc (DVD) for retaining the recording medium as the medium is placed onto said hub.

3. The hub in claim 1 wherein said resilient, disc-engaging hub is wade of a material that is more flexible than a frame of the storage package.

4. The hub of claim 1 wherein said base member has a generally annular shape.

5. The hub of claim 1 wherein said generally domed portion is configured, and said at least one gripping formation is disposed relative to said generally domed portion, so that when pressure is exerted against said generally domed portion, said gripping formation is retracted radially inward, releasing said gripping formation from the recording medium;

wherein said generally domed portion comprises a hemispherical upper portion that is disposed entirely above said base member and entirely above the recording medium when said at least one gripping formation is disposed above the recording medium.

6. The hub of claim 1 wherein said at least one gripping formation extends circumferentially about a periphery of said generally domed portion.

7. The hub of claim 6 wherein said at least one gripping formation flexes between an engaged position, in which said generally domed portion and said gripping formation extend through the hole of the recording medium, and a deformed release position in which said generally domed portion is deformed from user force to retract said gripping formation out of engagement with the recording medium.

8. The hub of claim 7 wherein when the recording medium is placed onto said hub such that said at least one gripping formation is disposed above the recording medium, said generally domed portion and said gripping formation together enclose a continuous volume disposed above the recording medium.

9. The hub of claim 1 wherein the hub is made of a member of the olefins.

10. The hub of claim 1 wherein the hub is made of a material taken from the group consisting of polypropylene, high-density polyethylene, low-density polyethylene, a resin, SAN, and silicone.

11. The hub of claim 1 wherein said at least one gripping formation protrudes radially directly from a periphery of said generally domed portion.

12. The hub of claim 1 wherein the recording medium comprises at least one of a compact disc (CD) and a digital versatile disc (DVD), and wherein said generally domed portion with said at least one gripping formation define a circular outer periphery having a larger diameter than a hole of said CD or DVD when said generally domed portion is undeformed.

13. The hub of claim 2 further comprising an annular shoulder raised above said base member, wherein when said generally domed portion and said gripping formation extends through the hole of the recording medium, said gripping formation biases the recording medium against said annular shoulder;

wherein said generally domed portion and said gripping formation together define a continuous volume disposed above said annular shoulder.

14. The hub of claim 1 wherein said resilient, disc-engaging hub is integrally formed on said base member.

15. A resilient, disc-engaging hub for a storage package for releasably storing a recording medium thereon, said hub comprising:

a base member for connecting the hub to at least one frame component of the storage package;

an annular shoulder raised above said base member;

a deformable, generally domed portion disposed above said annular shoulder and positioned to extend through a hole in the recording medium;

at least one gripping formation disposed above said annular shoulder and surrounding said generally domed portion, said at least one gripping formation comprising a series of individual, spaced protrusions extending radially directly from said generally domed portion;

wherein when said generally domed portion and said gripping formation extends through the hole of the recording medium, said gripping formation biases the recording medium against said annular shoulder;

wherein said generally domed portion and said gripping formation together completely enclose a single, continuous, internal volume disposed above said annular shoulder;

wherein said generally domed portion and said gripping formation together further completely enclose a single, continuous, internal volume disposed above the recording medium;

wherein an upper end of said generally domed portion projects above an upper end of the gripping formation to form a deflection distance;

wherein said disc-engaging hub is made of a flexible, resilient resin.

16. The hub of claim 15 wherein said disc-engaging hub is made of a material that is at least one of SAN and silicone.

17. The hub of claim 15 wherein said disc-engaging hub is a single, integral piece.

* * * * *